United States Patent
Shukh et al.

(10) Patent No.: US 6,621,659 B1
(45) Date of Patent: Sep. 16, 2003

(54) RECORDING HEAD WITH THROAT HEIGHT DEFINED BY NONMAGNETIC RECESS IN SHARED POLE

(75) Inventors: Alexander M. Shukh, Savage, MN (US); Edward S. Murdock, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 297 days.

(21) Appl. No.: 09/664,270

(22) Filed: Sep. 18, 2000

Related U.S. Application Data

(60) Provisional application No. 60/212,933, filed on Jun. 20, 2000.

(51) Int. Cl.[7] .............................. G11B 5/147; G11B 5/39
(52) U.S. Cl. ....................................... 360/126; 360/317
(58) Field of Search ................................ 360/125, 126, 360/317

(56) References Cited

U.S. PATENT DOCUMENTS

| | | | | |
|---|---|---|---|---|
| 5,606,478 A | * | 2/1997 | Chen et al. | 360/126 |
| 5,805,391 A | * | 9/1998 | Chang et al. | 360/122 |
| 5,812,350 A | * | 9/1998 | Chen et al. | 360/126 |
| 5,872,693 A | * | 2/1999 | Yoda et al. | 360/126 |
| 6,069,775 A | * | 5/2000 | Chang et al. | 216/22 |
| 6,104,576 A | * | 8/2000 | Santini | 360/126 |
| 6,130,805 A | * | 10/2000 | Sasaki et al. | 360/126 |
| 6,163,436 A | * | 12/2000 | Sasaki et al. | 360/123 |
| 6,278,580 B1 | * | 8/2001 | Sasaki | 360/120 |
| 6,441,995 B1 | * | 8/2002 | Sasaki | 360/126 |
| 2001/0043434 A1 | * | 11/2001 | Urai et al. | 360/126 |

\* cited by examiner

*Primary Examiner*—William Klimowicz
(74) *Attorney, Agent, or Firm*—Kinney & Lange, P.A.

(57) ABSTRACT

A giant magnetoresistance recording head includes a writer having a top pole, a shared pole, a conductive coil and a write gap region. The top pole includes a first top pole piece and a second top pole piece. The second top pole piece is formed at least in part over the first top pole piece and is recessed from the air bearing surface. The first top pole piece is formed over a top flat surface of the shared pole and is separated from the shared pole by the write gap region. The shared pole has a recess on the top surface. The recess is placed under the top pole and filled with a non-magnetic material. The non-magnetic recess in the shared pole defines the throat height of the writer.

16 Claims, 6 Drawing Sheets

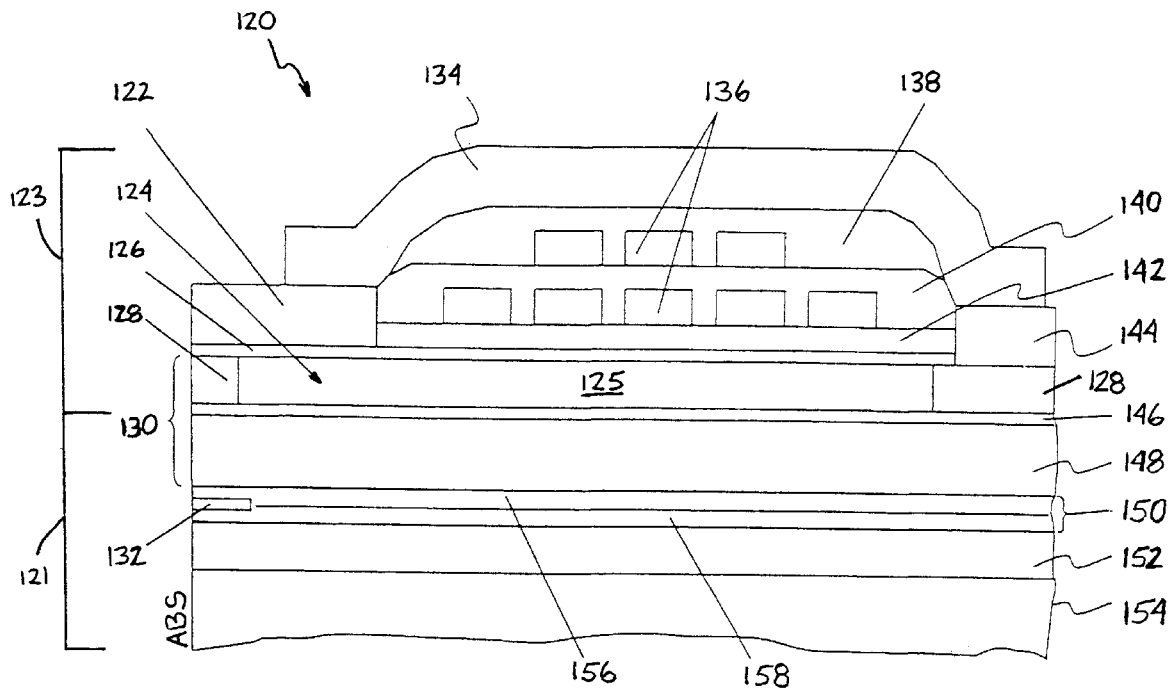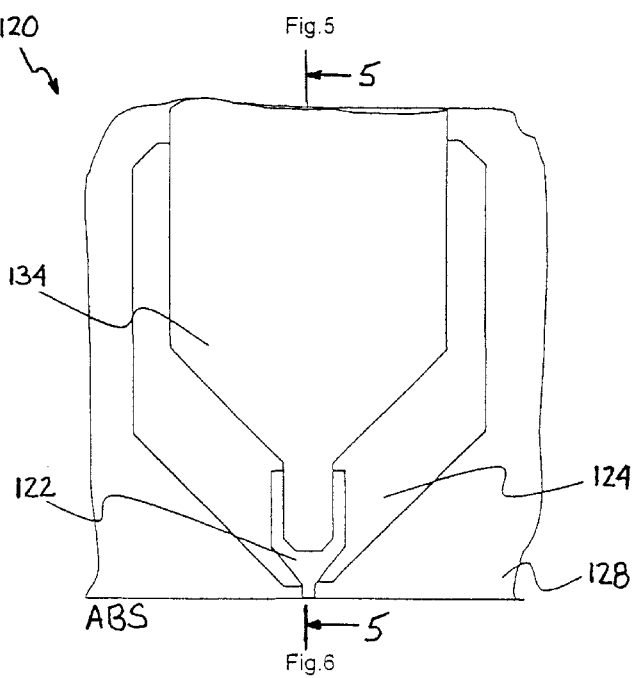

RECORDING HEAD WITH THROAT HEIGHT DEFINED BY NONMAGNETIC RECESS IN SHARED POLE

CROSS-REFERENCE TO RELATED APPLICATION(S)

This application claims the benefit of the filing date of U.S. provisional application serial No. 60/212,933 entitled "RECORDING HEAD WITH THROAT HEIGHT DEFINED BY NONMAGNETIC RECESS IN SHARED POLE," which was filed Jun. 20, 2000.

BACKGROUND OF THE INVENTION

The present invention relates generally to the field of electronic data storage and retrieval, and in particular to an improved writer in a merged giant magnetoresistance (GMR) read/write head.

A GMR read/write head generally consists of two portions, a writer portion for storing magnetically-encoded information on a magnetic disc and a reader portion for retrieving magnetically-encoded information from the disc. The reader portion typically consists of a bottom shield, a top shield, and a giant magnetoresistive (GMR) sensor positioned between the bottom and top shields. Magnetic flux from the surface of the disc causes rotation of the magnetization vector of a free layer of the GMR sensor, which in turn causes a change in electrical resistivity of the GMR sensor. The change in resistivity of the GMR sensor can be detected by passing a current through the GMR sensor and measuring a voltage across the GMR sensor. External circuitry then converts the voltage information into an appropriate format and manipulates that information as necessary.

The writer portion typically consists of a top and a bottom pole, which are separated from each other at an air bearing surface of the writer by a gap layer, and which are connected to each other at a region distal from the air bearing surface by a back gap closer or back via. Positioned between the top and bottom poles are one or more layers of conductive coils encapsulated by insulating layers. The writer portion and the reader portion are often arranged in a merged configuration in which a shared pole serves as both the top shield in the reader portion and the bottom pole in the writer portion.

To write data to the magnetic media, an electrical current is caused to flow through the conductive coils to thereby induce a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole near the write gap at the air bearing surface.

In magnetic recording, it is desirable to improve the areal density at which information can be recorded and reliably read. This desire has lead to a trend toward shorter bit length along a magnetic recording track and a shrinking track width. Narrow track widths are achieved by use of narrow pole tips at an air bearing surface (ABS) of the head. However, the pole width must be large in the paddle region of the head where the coil passes between the poles. The larger pole width is necessary to gain adequate magnetic flux through the poles by the coil write current. Hence, it is common to taper the pole from the larger width in the paddle region to a narrower width in the pole tip region at the ABS.

The length of the bit cell is largely dictated by a length of the write gap. The gap length is defined as the length between opposing pole tips at the ABS along the length of a recorded track. The gap height, commonly referred to as the throat height, is the distance from the ABS to a "zero throat position", where both of the pole tips converge at the write gap. Typically, the throat height is 1 or 2 micrometers and is defined in part by the position of a zero throat insulator. The zero throat insulator is used not only for zero throat height definition, but also to improve efficiency of the recording head. The thickness of the zero throat insulator is typically about 1–2 micrometers.

Prior art configurations have a distinct limitation in that the top pole is typically formed over the zero throat insulator, resulting in the top pole having a "bump" shape. The portion of the top pole adjacent the air bearing surface in prior art configurations is sloped. It is therefore difficult to precisely control the width of the top pole at the air bearing surface, particularly as the width necessarily becomes smaller to allow for greater data storage densities. Since the pole tip is formed on the zero throat insulator, which requires a thick photoresist process with a very high aspect ratio of the resist thickness to the pattern width that is targeted, the top pole tip width is limited to the precision of the photolithography. Moreover, the highly developed topography of the top pole tip at the ABS initiates light distortion on the slope of the zero throat insulator during exposing. Hence, as the track width decreases, it becomes progressively more difficult to produce the pole tips to the precision required. To solve this problem, a two-piece structure of the top pole was proposed in U.S. Pat. No. 5,452,164.

The use of a two-piece pole structure facilitates the achievement of a submicron pole tip width at the ABS. The two-piece pole employs a first piece (pole tip) having a very narrow width at the ABS, and a second pole piece connected to the first pole piece and extending to the back region of the head. Thus, the first pole piece defines the narrow track width, and the second pole piece links through the coils and connects to the other (e.g., bottom) pole. The second pole piece of a two-piece pole is made wider at the ABS than the first pole piece due to photolithography limitations. As a result, sharp corners are formed in the second pole piece at the ABS. These corners produce a large fringing magnetic field during recording. The fringing field may adversely affect data recorded on adjacent tracks by erasing or re-writing previously recorded information.

In addition, the two-piece pole structure design proposed in U.S. Pat. No. 5,452,164 has a high sensitivity of non-linear transition shift (NLTS) and overwrites (OVW) to the write current due to a poor control of the pole tip saturation at the ABS. An improved structure of the top pole exhibiting better NLTS and OVW characteristics was proposed in U.S. Pat. No. 5,801,910. In the improved structure, the pole tip has a funnel shape with a long saturation zone localized at the ABS. That saturation zone is generated by one or more break points. However, the funnel-shaped top pole tip is normally formed on the zero throat insulator with uncontrolled light distortion.

It would be desirable to produce a read/write head that allows for greater tolerance control of the width of the top pole at the air bearing surface, that exhibits good NLTS and OVW characteristics, and that eliminates the fringing field effect found in prior art pole structures.

BRIEF SUMMARY OF THE INVENTION

A magnetic recording head includes a writer having a top pole, a shared pole, a first conductive coil and a write gap region. The top pole includes a first top pole piece and a second top pole piece. The second top pole piece is formed at least in part over the first top pole piece. The write gap region is positioned between the top pole and the shared pole and under the first conductive coil. The second top pole piece is recessed from the air bearing surface. A recess is formed in the shared pole and filled with a non-magnetic material. The recess defines a throat height of the magnetic recording head.

The read/write head of the present invention includes a substantially planar first top pole piece, which allows for greater tolerance control of the width of the top pole at the air bearing surface. The first top pole piece has a funnel-shape with a long saturation zone to suppress sensitivity of the NLTS and OVW characteristics to the write current. By recessing the second top pole piece from the air bearing surface, the fringing field effect found in prior art structures is eliminated.

BRIEF DESCRIPTION OF THE DRAWINGS

FIG. 5 is a side cross-sectional view of a merged GMR read/write head according to a first preferred embodiment of the present invention.

FIG. 6 is a top view of the read/write head of FIG. 5.

DETAILED DESCRIPTION

Figure 1:
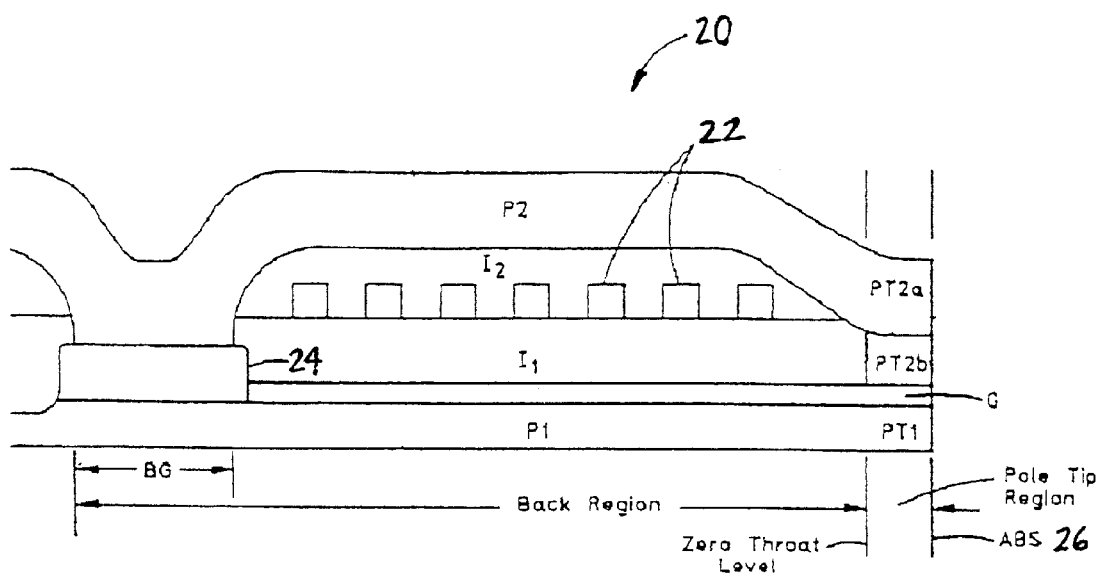
FIG. 1 is a side cross-sectional view of a prior art merged MR head.
Figure 2:
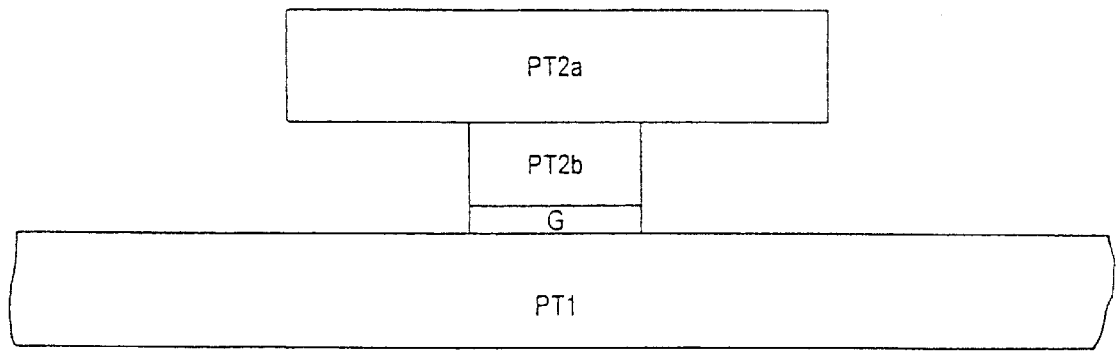
FIG. 2 is an ABS view of the prior art head of FIG. 1.

FIG. 1 is a side cross-sectional view of a prior art merged MR head disclosed in U.S. Pat. No. 5,452,164. Head 20 includes top pole P2, second insulation layer 12, conductor layer 22, first insulation layer I1, bottom magnetic layer 24, bottom pole P1, pole tip elements PT2a and PT2b, gap layer G and pole tip PT1. FIG. 1 also shows pole tip region 26, the zero throat level, a back region and a back gap (BG) region. As shown in FIG. 1, pole tip elements PT2a and PT2b both extend to the ABS. FIG. 2 shows an ABS view of the head of FIG. 1. As shown in FIG. 2, the top pole tip element PT2a is made wider at the ABS than the bottom pole tip element PT2b due to photolithography limitations. The wider top pole tip element PT2a causes a large fringing magnetic field to be produced during recording. The fringing field may adversely affect data recorded on adjacent tracks by erasing or re-writing previously recorded information. In addition, the two-piece pole structure proposed in U.S. Pat. No. 5,452,164 has a high sensitivity of non-linear transition shift (NLTS) and overwrites (OVW) to the write current due to a poor control of the pole tip saturation at the ABS.

Figure 3:
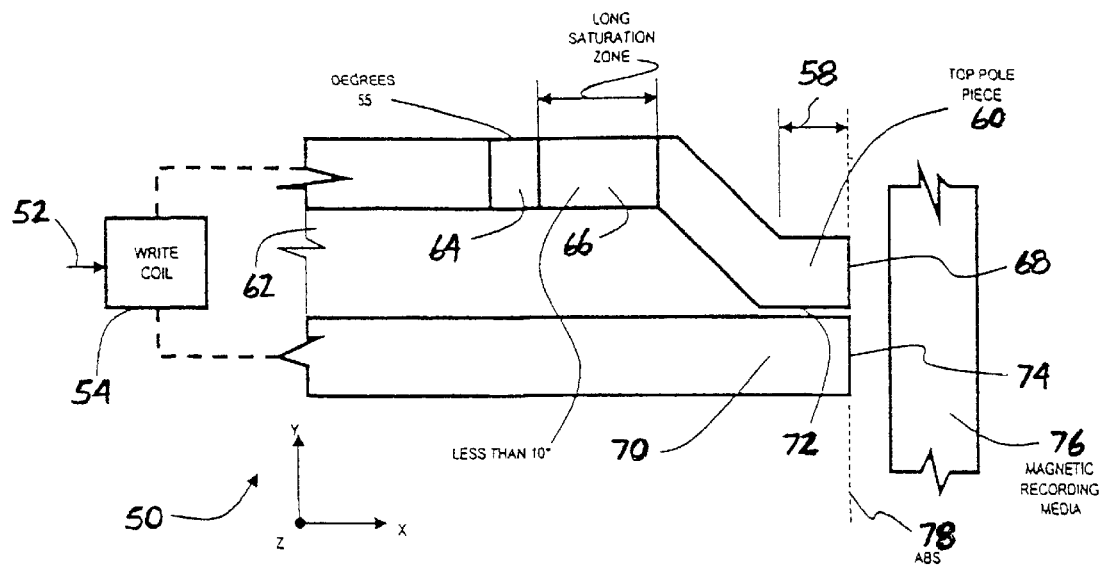
FIG. 3 is a side view of a prior art magnetic write head.
Figure 4:
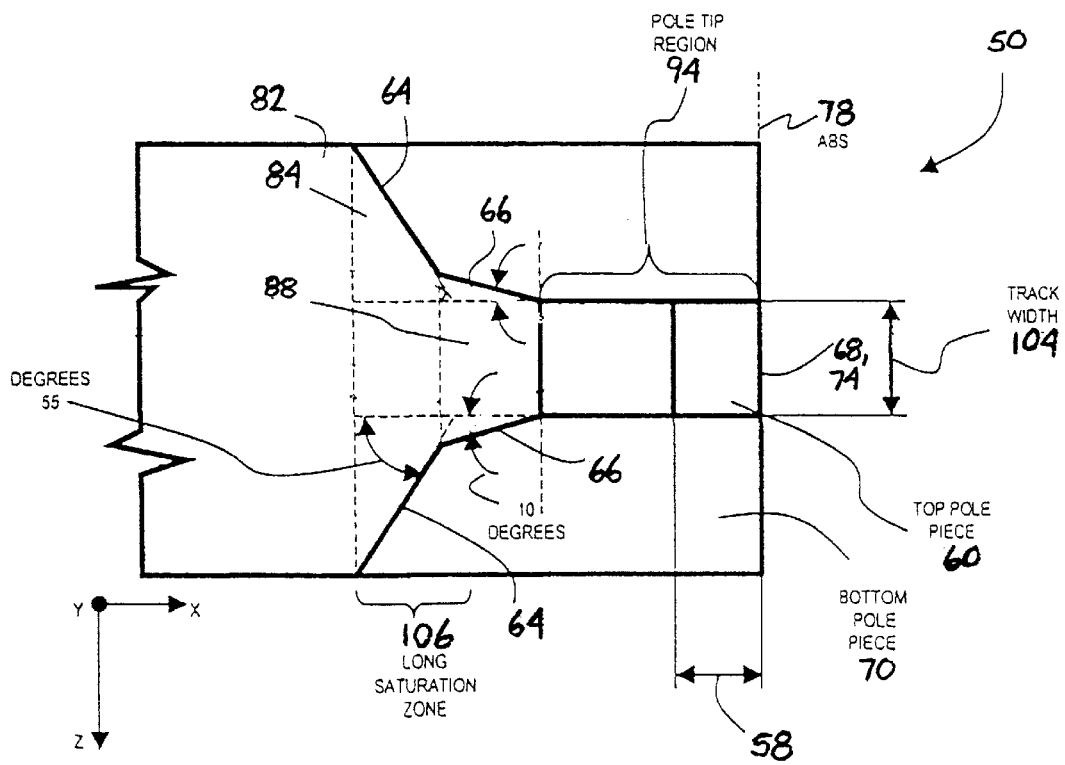
FIG. 4 is a top view of the prior art write head of FIG. 3.

An improved structure of the top pole exhibiting better NLTS and OVW characteristics was proposed in U.S. Pat. No. 5,801,910. FIG. 3 and FIG. 4 show the prior art head disclosed in U.S. Pat. No. 5,801,910. FIG. 3 is a side view of the prior art magnetic write head. FIG. 4 is a top view of the prior art write head of FIG. 3. Write head 50 includes electrical energization 52, write coil 54, top pole piece 60, gap layer 62, bottom pole piece 70 and gap 72. Top pole piece 60 includes side surfaces 64 and 66, top pole tip 68, wide portion 82 and convergent portions 84 and 88. Bottom pole piece 70 includes bottom pole tip 74. FIG. 4 also shows throat height 58, pole tip region 94, track width 104 and saturation zone 106. The funnel-shaped structure of top pole piece 60 results in the generation of saturation zone 106, which results in a lower sensitivity of the NLTS and OVW characteristics to the write current. However, the funnel-shaped top pole piece 60 is normally formed on a zero throat insulator with uncontrolled light distortion.

FIG. 5 is a cross-sectional view of a merged GMR read/write head according to a preferred embodiment of the present invention. Read/write head 120 is capable of supporting high-speed recording with a submicron track width. Read/write head 120 includes reader portion 121 and writer portion 123. Reader portion 121 includes substrate 154, bottom shield 152, GMR sensor 132, read gap 150 and shared pole 130. Read gap 150 includes two insulating layers 156 and 158. GMR sensor 132 is positioned in read gap 150 between insulating layers 156 and 158. Read gap 150 isolates GMR sensor 132 from shared pole 130 and bottom shield 152.

Writer portion 123 is a multi-layer structure that includes shared pole 130, coil 136, write gap 126, first top pole 122, second top pole 134, back gap closer 144 and insulating layers 138, 140 and 142. Shared pole 130 serves as a top shield for reader 121 and a bottom pole for writer 123. As a shield, shared pole 130 should have a high permeability, low coercivity and magnetostriction, and a stable domain structure. As the bottom pole of the writer 123, shared pole 130 should possess high magnetization saturation and low electrical conductivity. To satisfy these requirements, shared pole 130 has a multi-layer structure including bottom magnetic layer 148, first top magnetic layer 146 and second top magnetic layer 128. Bottom magnetic layer 148 of shared pole 130 is preferably made of a soft magnetic material such as $Ni_{79}Fe_{21}$. Top magnetic layers 146 and 128 are preferably made of a material with a high magnetization saturation, such as $Ni_{45}Fe_{55}$ or NiCoFe-alloys, exhibiting a saturation induction $B_s$ of up to 2.1 T. The multi-layer structure of shared pole 130 provides high shielding and writing performance, and suppresses writer effect on reader 121.

A recess 124 is formed in shared pole 130. Recess 124 is preferably filled with a non-magnetic material 125, such as $Al_2O_3$, although any non-magnetic material including metals may be used in recess 124.

The throat height is defined by the height of the shared pole 130 located between the ABS and the non-magnetic recess 124. In the writer 123 according to the present invention, the non-magnetic recess 124 in second top layer 128 of shared pole 130 serves as the traditional zero throat insulator defining the zero throat. The top surface of shared pole 130 adjacent to write gap 126 is planarized by polishing. The flat top surface of shared pole 130 and the absence of the traditional zero throat insulator allow a photoresist with a reduced thickness to be used during the formation of first top pole 122, which considerably improves the resolution of the photo technology. Light distortion is eliminated during exposure of first top pole 122. Patterns of 0.15–0.2 micrometers wide can be formed without the use of expensive and time consuming ion mill focused ion beam technologies.

Write gap 126 is formed over shared pole 130, and is preferably made of $Al_2O_3$. The top pole of writer 123 has a two-piece structure, including first top pole 122 (pole tip) and second top pole 134. First top pole 122 has a funnel shape with several break points (see FIG. 6) to provide a long saturation zone to suppress sensitivity of the writer characteristics to the write current. First top pole 122 is preferably made of a high moment material such as $Ni_{45}Fe_{55}$ or CoNiFe. The thickness of first top pole 122 is preferably about 1.0–2.0 micrometers. Second top pole 134 overlays first top pole 122. Second top pole 134 contacts shared pole 130 in the back gap region through back gap closer 144. Second top pole 134 and back gap closer 144 are preferably made of $Ni_{45}Fe_{55}$ and have a thickness of 1.5–2.5 micrometers.

Write head 120 also includes a coil 136 isolated from the rest of the head by insulating layers 138, 140 and 142, each made of a hard baked photoresist. Insulating layer 142 can alternatively be made of $Al_2O_3$ or other vacuum deposited insulator. Coil 136 has a two layer structure and is preferably made of Cu. Coil 136 is in a pancake configuration, and encircles back gap closer 144.

FIG. 6 shows a top view of the head of FIG. 5. The cross-sectional view shown in FIG. 5 is viewed from the perspective of section lines 5—5 in FIG. 6. To provide high efficiency of the write head 123, the shape of non-magnetic recess 124 in second top magnetic layer 128 of shared pole 130 is made to resemble the projection of second top pole 134. The magnetic material of top layer 128 of shared pole 130 surrounds recess 124, which provides effective flux supply to gap area 126 during recording.

As shown in FIG. 6, top magnetic layer 128 narrows to the throat height value at the ABS near the center of read/write head 120 and broadens at the edges of read/write head 120. Thus, top magnetic layer 128 has a variable height along the ABS.

First top pole 122 is patterned to a submicron width near the ABS and broadens away from the ABS. The points at which top pole 122 changes in width are referred to as "break points". Because of the planar structure of first top pole 122, the size of the various regions of first top pole 122 defined by break points may be precisely controlled.

Figure 7:
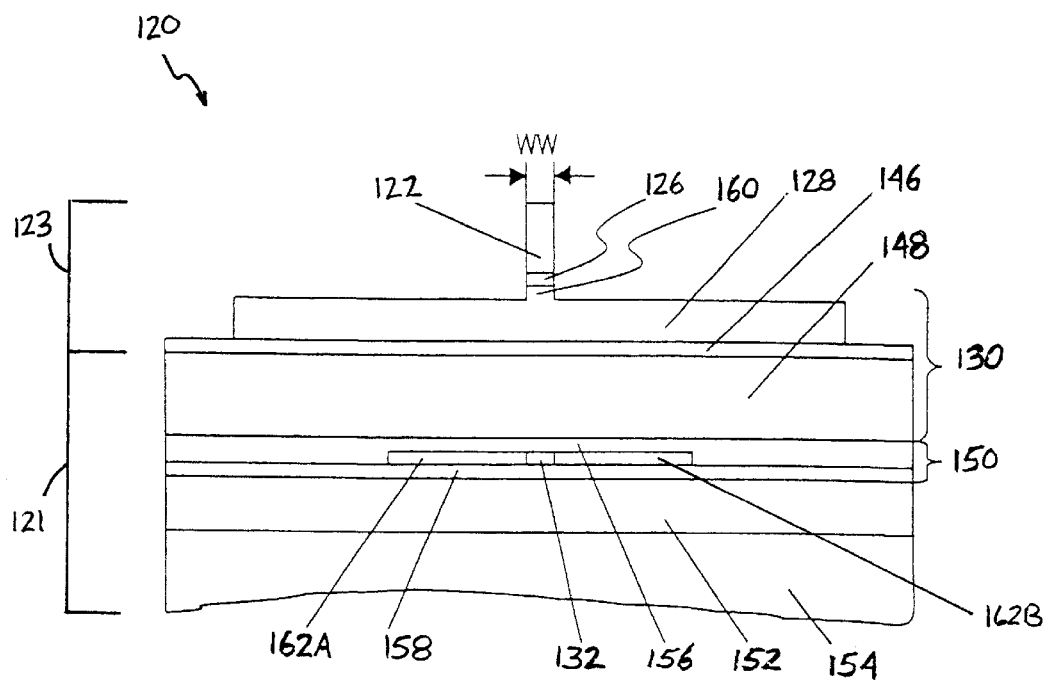
FIG. 7 is an ABS view of the read/write head of FIG. 5.

An ABS view of merged GMR head 120 according to the present invention is shown in FIG. 7. Read/write head 120 in FIG. 7 is viewed from the perspective of a disc looking at the ABS of head 120. Conductor leads 162A and 162B are coupled to GMR sensor 132. Top layer 128 of shared pole 130 is made separately from layers 146 and 148 by using an additional photomask. Writer portion 123 includes notch 160 formed on a top surface of top magnetic layer 128. Notch 160 improves the track resolution of writer portion 123. The width of notch 160 is equal to the width of first top pole 122 in write gap area 126 adjacent the ABS (i.e., writer width or WW). Notch 160 is made by ion mill on a top surface of top layer 128 of shared pole 130. First top pole 122 serves as a mask during ion mill of notch 160.

Figure 8:
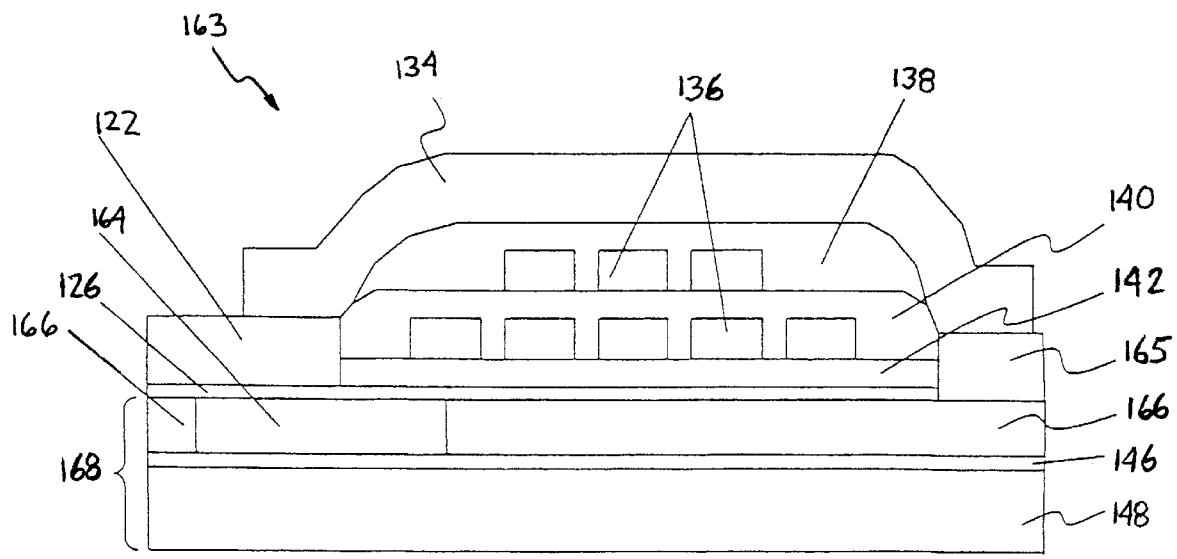
FIG. 8 is a side cross-sectional view of a write head according to a second preferred embodiment of the present invention, with a modified recess structure.
Figure 9:
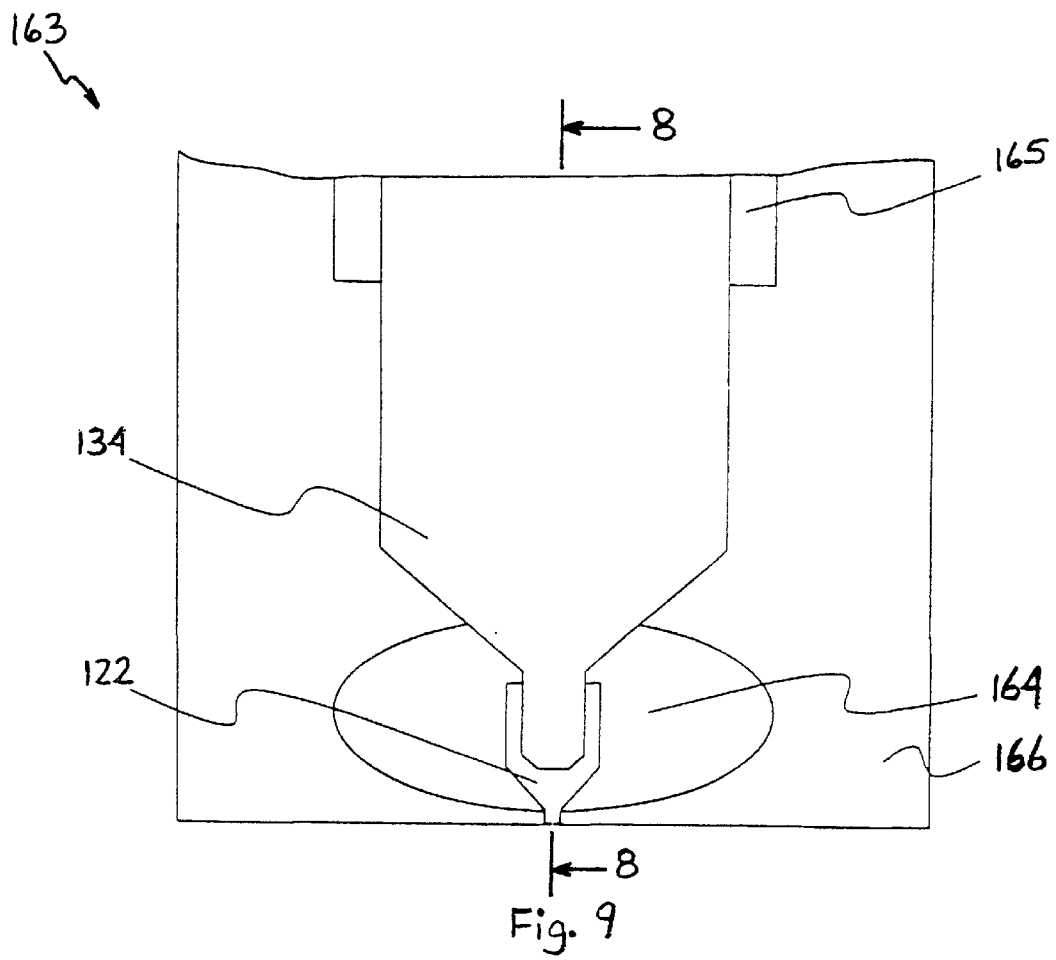
FIG. 9 is a top view of the write head of FIG. 8.

A second preferred embodiment of the present invention is shown in FIG. 8 and FIG. 9. FIG. 8 shows a cross-sectional view of read/write head 163. FIG. 9 shows a top view of read/write head 163. The cross-sectional view shown in FIG. 8 is viewed from the perspective of section lines 8—8 in FIG. 9. The reader portion of read/write head 163 is the same as reader 121 of read/write head 120, and is not shown in FIGS. 8 and 9. Read/write head 163 is substantially the same as read/write head 120 shown in FIGS. 5–7, but has a different structure of shared pole 168.

The shape of non-magnetic recess 164 in shared pole 168 has an ellipse-like shape and is localized in write gap area 126 under first top pole 122 and a sloped region of second top pole 134. The ellipse-like shape of recess 164 suppresses domain wall formation in gap area 126 due to a uniform distribution of magnetization in top magnetic layer 166 of shared pole 168, which surrounds recess 164. The suppression of domain wall formation results in improved magnetic stability of the GMR sensor. As shown in FIG. 9, back gap closer 165 extends beyond second top pole 134, and is therefore visible in the top view. Like top magnetic layer 128 shown in FIG. 6, top magnetic layer 166 shown in FIG. 9 has a variable height along the ABS.

Figure 10:
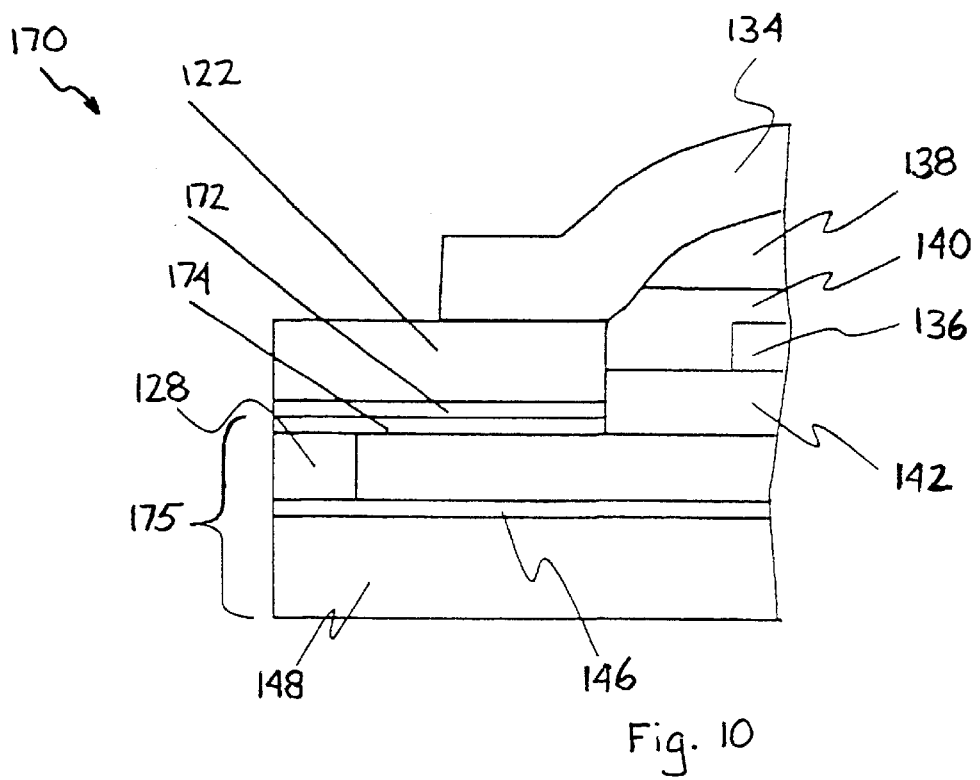
FIG. 10 is a side cross-sectional view of a write head according to a third preferred embodiment of the present invention, with the notch, write gap and first top pole formed with the same photomask using electroplating.
Figure 11:
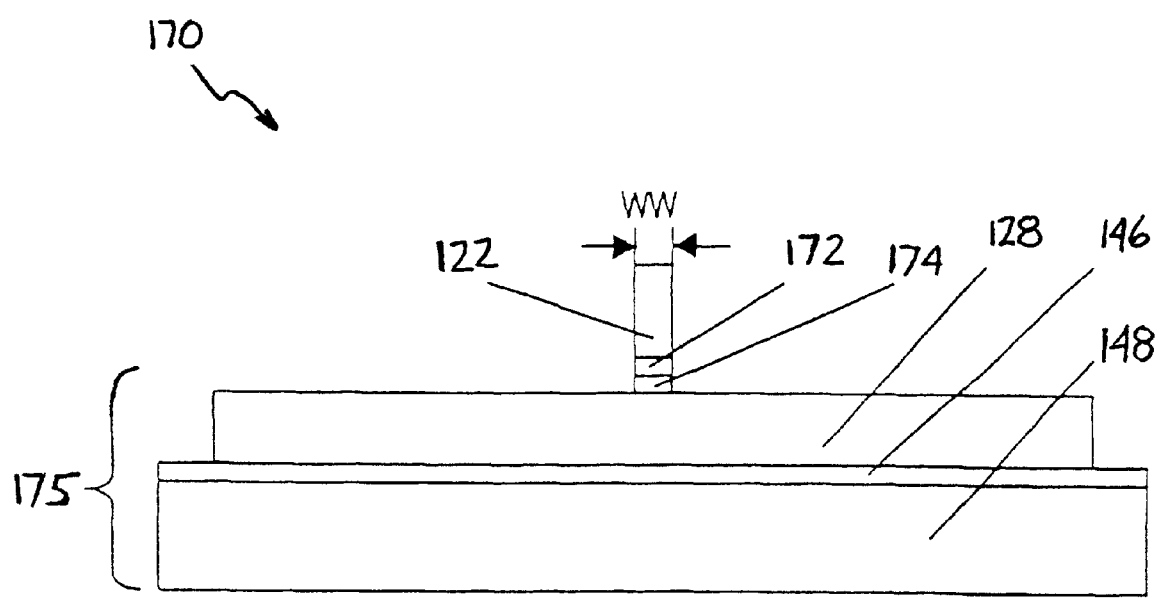
FIG. 11 is an ABS view of the write head of FIG. 10.

FIG. 10 and FIG. 11 show a third preferred embodiment of a read/write head according to the present invention. FIG. 10 shows a cross-sectional view of read/write head 170. FIG. 11 shows an ABS view of read/write head 170. The reader portion of read/write head 170 is the same as reader 121 of read/write head 120, and is not shown in FIGS. 10 and 11. Read/write head 170 is substantially the same as read/write heads 120 and 163 shown in FIGS. 5–9, but includes a different write gap structure. In read/write head 170, notch 174 of shared pole 175, write gap 172 and first top pole 122 are made through the same photomask by electroplating. Notch 174 is preferably made of magnetic material with a high saturation induction, such as $Ni_{45}Fe_{55}$, and has a thickness of 0.2–0.4 micrometers. Write gap 172 is preferably 0.1–0.3 micrometers thick and is made of a non-magnetic conductive material such as NiP, NiPd, or a similar material. The process for forming layers 122, 172, and 174 is based on photo technology only, and does not require the ion mill for notch definition. As shown in FIG. 10, write gap 172 ends at insulating layer 142, rather than extending under insulating layer 142 as in the embodiments shown in FIGS. 5–9.

Although the present invention has been described with reference to preferred embodiments, workers skilled in the art will recognize that changes may be made in form and detail without departing from the spirit and scope of the invention.

What is claimed is:

1. A magnetic recording head having an air bearing surface, the magnetic recording head comprising:

a writer having a top pole, a shared pole, a first conductive coil and a write gap region, the top pole including a first top pole piece and a second top pole piece, the second top pole piece formed at least in part over the first top pole piece, the write gap region positioned between the top pole and the shared pole and under the first conductive coil, the shared pole including a multi-layer structure having at least one layer made of a soft magnetic material with high permeability and low coercivity, the shared pole also including a first layer of a magnetic material with a high magnetization saturation overlying the layer of soft magnetic material and a second layer of a magnetic material with a high magnetization saturation, the second layer surrounding a recess filled with a non-magnetic material for defining a throat height of the magnetic recording head.

2. The magnetic recording head of claim 1, wherein the second top pole piece is recessed from the air bearing surface.

3. The magnetic recording head of claim 1, wherein the non-magnetic material is $Al_2O_3$.

4. The magnetic recording head of claim 1, wherein the non-magnetic material is a metal.

5. The magnetic recording head of claim 1, wherein the shape of an outer perimeter of the recess substantially conforms to the shape of an outer perimeter of the second top pole piece.

6. The magnetic recording head of claim 1, wherein a top surface of the shared pole is made substantially planar by polishing.

7. The magnetic recording head of claim 1, and further comprising a second conductive coil positioned between the first conductive coil and the write gap region.

8. The magnetic recording head of claim 7, and further comprising three insulating layers positioned between the second top pole piece and the write gap region for insulating the first and the second conductive coils.

9. The magnetic recording head of claim 1, wherein the recess is substantially elliptical in shape and is positioned near the air bearing surface substantially under the first top pole piece.

10. The magnetic recording head of claim 1, wherein the first top pole piece is substantially funnel-shaped and includes a saturation region.

11. The magnetic recording head of claim 1, wherein the shared pole includes a notch near the air bearing surface, the notch extending upwards from the shared pole toward the top pole, the notch having a width substantially the same as a width of the first top pole piece near the air bearing surface.

12. The magnetic recording head of claim 11, wherein the notch, the write gap region and the first top pole piece are made through the same photomask by electroplating.

13. A magnetic recording head having an air bearing surface, the magnetic recording head comprising:
   a first and a second top pole piece, the second top pole piece formed at least in part over the first top pole piece, the second top pole piece recessed from the air bearing surface;
   a shared pole including a recess completely filled with a non-magnetic metal;
   a write gap layer positioned between the first top pole piece and the shared pole; and
   a first conductive coil positioned between the second top pole piece and the write gap layer.

14. A magnetic recording head having an air bearing surface, the magnetic recording head comprising:
   a first and a second top pole piece, the second top pole piece formed at least in part over the first top pole piece, the second top pole piece recessed from the air bearing surface;
   a shared pole including a recess, the shape of an outer perimeter of the recess substantially conforming to the shape of an outer perimeter of the second top pole piece;
   a write gap layer positioned between the first top pole piece and the shared pole; and
   a first conductive coil positioned between the second top pole piece and the write gap layer.

15. A magnetic recording head having an air bearing surface, the magnetic recording head comprising:
   a writer having a top pole, a shared pole, a first conductive coil and a write gap region, the top pole including a first top pole piece and a second top pole piece, the second top pole piece formed at least in part over the first top pole piece, the write gap region positioned between the top pole and the shared pole and under the first conductive coil, the shared pole including a multi-layer structure having at least one layer made of a soft magnetic material with high permeability and low coercivity, the shared pole also including at least one layer made of a magnetic material with a high magnetization saturation; and
   a recess formed in the shared pole and filled with a non-magnetic material for defining a throat height of the magnetic recording head, wherein the recess is substantially elliptical in shape and is positioned near the air bearing surface substantially under the first top pole piece.

16. A magnetic recording head having an air bearing surface, the magnetic recording head comprising:
   a writer having a top pole, a shared pole, a first conductive coil and a write gap region, the top pole including a first top pole piece and a second top pole piece, the second top pole piece formed at least in part over the first top pole piece, the write gap region positioned between the top pole and the shared pole and under the first conductive coil, the shared pole including a multi-layer structure having at least one layer made of a soft magnetic material with high permeability and low coercivity, the shared pole also including at least one layer made of a magnetic material with a high magnetization saturation, the shared pole further including a notch formed near the air bearing surface, the notch extending upwards from the shared pole toward the top pole, the notch having a width substantially the same as a width of the first top pole piece near the air bearing surface; and
   a recess formed in the shared pole and filled with a non-magnetic material for defining a throat height of the magnetic recording head.

* * * * *